(12) United States Patent
Dietrich et al.

(10) Patent No.: US 7,468,935 B2
(45) Date of Patent: Dec. 23, 2008

(54) OPTIMIZED TRACKING METHOD

(75) Inventors: Christoph Dietrich, Heidelberg (DE); Christian Büchler, Villingen-Schwenningen (DE)

(73) Assignee: Thomson Licensing, Boulogne-Billancourt (FR)

(*) Notice: Subject to any disclaimer, the term of this patent is extended or adjusted under 35 U.S.C. 154(b) by 171 days.

(21) Appl. No.: 10/517,467

(22) PCT Filed: Jun. 5, 2003

(86) PCT No.: PCT/EP03/05902

§ 371 (c)(1), (2), (4) Date: Dec. 6, 2004

(87) PCT Pub. No.: WO03/105142

PCT Pub. Date: Dec. 18, 2003

(65) Prior Publication Data

US 2005/0213457 A1 Sep. 29, 2005

(30) Foreign Application Priority Data

Jun. 7, 2002 (DE) .................................. 102 25 271

(51) Int. Cl.
*G11B 7/00* (2006.01)
(52) U.S. Cl. ............... 369/44.26; 369/44.29; 369/44.31; 369/44.35; 369/44.36; 369/44.32; 369/53.28; 369/53.35; 369/53.23
(58) Field of Classification Search ............... 369/44.26, 369/44.29, 44.31, 44.35, 44.32, 44.36, 53.23, 369/53.28, 53.35
See application file for complete search history.

(56) References Cited

U.S. PATENT DOCUMENTS

| 4,866,688 | A | * | 9/1989 | Ohtake et al. | ............. | 369/44.13 |
| 5,251,194 | A | * | 10/1993 | Yoshimoto et al. | ........ | 369/44.26 |
| 5,268,887 | A | * | 12/1993 | Honguh et al. | ............ | 369/44.13 |
| 5,517,485 | A | * | 5/1996 | Nishiuchi et al. | ......... | 369/275.3 |
| 5,754,506 | A | * | 5/1998 | Nagasawa et al. | ......... | 369/44.26 |

(Continued)

FOREIGN PATENT DOCUMENTS

JP          9/167359           6/1997

(Continued)

OTHER PUBLICATIONS

Machine Translation of Japan Publication No. 08231588 by Sofue Masaaki in Feb. 26, 1997.*

(Continued)

*Primary Examiner*—Tan X Dinh
*Assistant Examiner*—Linh T Nguyen
(74) *Attorney, Agent, or Firm*—Joseph J. Laks; Robert D. Shedd; Reitseng Lin

(57) ABSTRACT

The invention relates to a method for optimized tracking of an optical scanner along a track of an optical recording medium, the track having information markings arranged in dense succession, and also having fundamental changes in properties in significantly lower density. The method has the following steps: formation of a track error signal, detection of the occurrence of fundamental changes in properties of the track, formation of an offset value from the comparison of the value of the track error signal that occurs shortly before and shortly after the fundamental change in properties, formation of the track error signal, taking account of the offset value and repetition of the aforementioned steps.

5 Claims, 2 Drawing Sheets

U.S. PATENT DOCUMENTS

Figure 1:
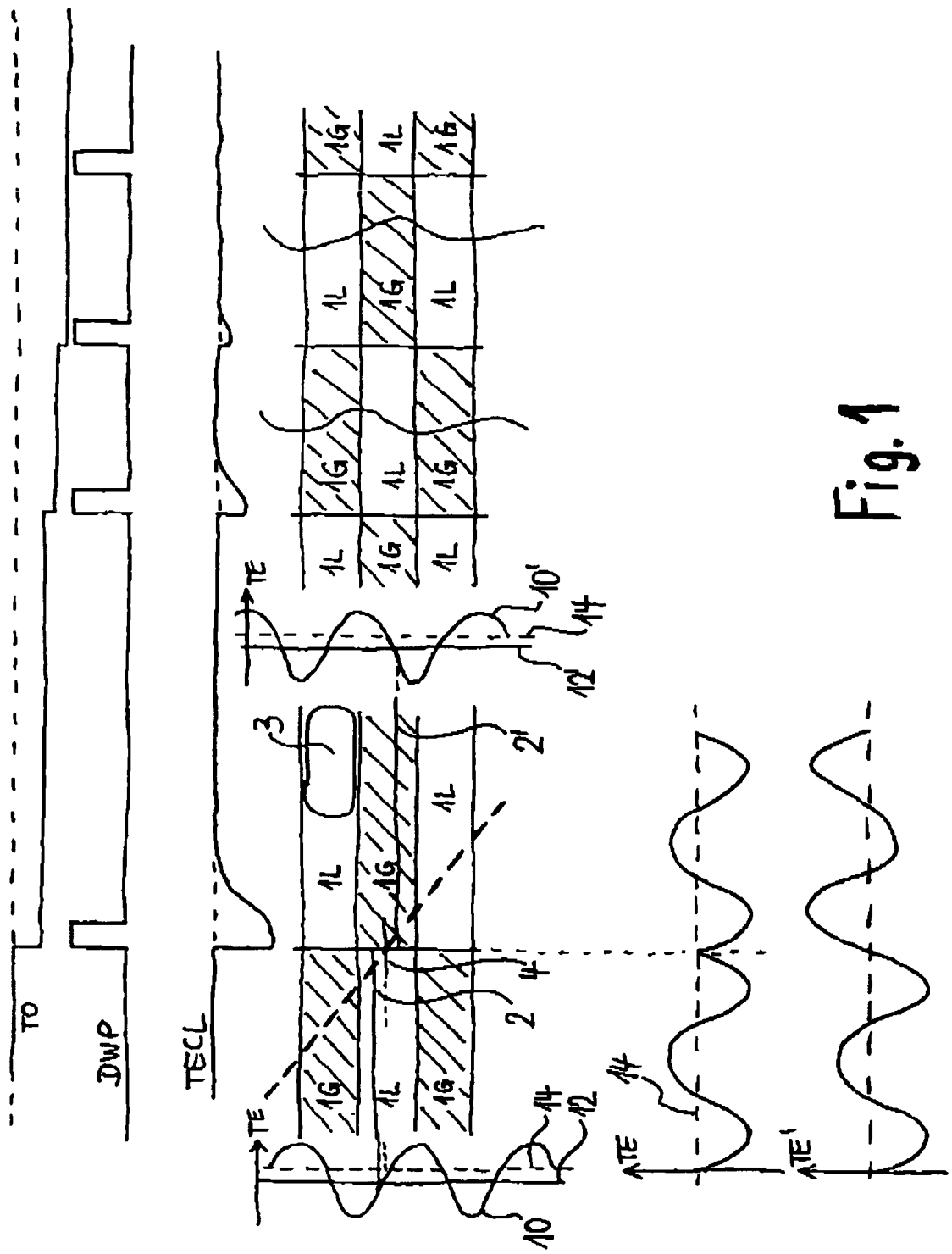

| | | | |
|---|---|---|---|
| 5,892,740 A * | 4/1999 | Nagasawa et al. | 369/44.26 |
| 5,909,416 A * | 6/1999 | Matsui | 369/44.41 |
| 6,175,540 B1 * | 1/2001 | Kim | 369/44.35 |
| 6,266,305 B1 * | 7/2001 | Buchler | 369/44.32 |
| 6,310,838 B1 * | 10/2001 | Heemskerk et al. | 369/30.1 |
| 6,314,066 B1 * | 11/2001 | Hong et al. | 369/44.28 |
| 6,333,902 B1 * | 12/2001 | Shim | 369/47.54 |
| 6,337,839 B1 * | 1/2002 | Nakane et al. | 369/59.25 |
| 6,822,935 B1 * | 11/2004 | Park et al. | 369/53.22 |
| 2001/0009535 A1 | 7/2001 | Hong et al. | |
| 2002/0039331 A1 * | 4/2002 | Park | 369/44.26 |
| 2005/0002292 A1 * | 1/2005 | Komma et al. | 369/44.37 |
| 2005/0058038 A1 * | 3/2005 | Park et al. | 369/53.2 |

FOREIGN PATENT DOCUMENTS

| | | |
|---|---|---|
| JP | 9-231588 | 9/1997 |
| JP | 9-320065 | 12/1997 |

OTHER PUBLICATIONS

Patent Abstracts of Japan, vol. 1998, No. 01, Jan. 30, 1998 & JP 09-231588 Ricoh Co. Ltd. (See Ref. AC).

Patent Abstracts of Japan, vol. 1997, No. 10, Oct. 31, 1997 & JP 09-167359 Hitachi Ltd (See Ref. AD).

Patent Abstracts of Japan, vol. 1998, No. 04, Mar. 31, 1998 & JP 09-320065 Nikon Corp (See Ref. AE).

* cited by examiner

OPTIMIZED TRACKING METHOD

This application claims the benefit, under 35 U.S.C. § 365 of International Application PCT/EP03/05902, filed Jun. 5, 2003, which was published in accordance with PCT Article 21(2) on Dec. 18, 2003 in German and which claims the benefit of German patent application No. 10225271.8, filed Jun. 7, 2002.

The invention relates to the setting of the track error offset when reading from and writing to optical recording media, often also referred to as optical disks, in the DVD-RAM format or a format having similar properties.

The invention describes a criterion according to which the track error offset can be set with the purpose of keeping the optical scanner as far as possible exactly on the center of the pre-impressed tracks (Land/Groove).

Generally, the "push-pull" and "differential push-pull" methods are utilized for generating a track error signal for rewritable media. These methods normally generate a sinusoidal error signal that is symmetrical with respect to the track center and may be beset by an offset as a result of electrical and optical influences. Since this signal is usually symmetrical with respect to the track center, said offset may be compensated for by electrically symmetrizing the upper and lower envelopes about zero such that the scanner is kept exactly on the track center given closed-loop track control. However, this is no longer applicable if the track error signal becomes asymmetrical with respect to the track center on account of an asymmetrical light distribution in the reading-out light spot. This may easily occur for example when the laser chip is tilted in the housing within the scope of the necessary tolerances. Since rewritable disks rely on a high efficiency of the optical system, it is necessary to use collimators of comparatively short focal length. This has the effect that such deviations from the optical axis lead to greater asymmetries in the beam profile than in the case of reading scanners of long focal length. In that case the earlier known solutions do not afford a possibility of correctly compensating for the track error offset.

It is an object of the invention to specify an optimized tracking method and also a corresponding apparatus. The method according to the invention for optimized tracking of an optical scanner along a track of an optical recording medium, which track has information markings arranged in dense succession and also a fundamental change in property in significantly lower density, consists in forming a track error signal, for example in accordance with the known tracking method: push-pull method or three-beam method, in detecting the occurrence of fundamental changes in properties of the track, and in forming an offset value from the comparison of the value of the track error signal before and after the occurrence of the fundamental change in properties, and in superposing said offset value on the track error signal in order to form an optimized track error signal. The aforementioned steps are either repeated continuously, i.e. throughout the scanning operation, which has the advantage of constant adaptation to offset values that possibly change during operation. It is likewise advantageous to repeat the steps only until a specific predetermined value is undershot. This has the advantage of saving work steps, and is sufficient if no or only slight changes in the offset value occur during operation. The method steps are advantageously repeated from time to time, for example every two minutes or every 300 revolutions of the optical recording medium. It likewise lies within the scope of the invention to execute the step only once for a predefined number of repetitions without taking account of the undershooting of a minimum value or of another criterion. The information markings arranged in dense succession on the track are often also referred to as pits and constitute elevations or depressions with respect to the track, brighter or darker locations with respect to the track, regions of the track that are magnetized in a specific direction, or similar known markings. Examples of fundamental changes in properties of the track that occur in significantly lower density than the information markings are the transition from a track formed as an elevation to a track formed as a depression, the so-called groove/land transition, the transition from a bright to a dark track, the transition from a magnetically preimpressed track to a magnetically non-preimpressed or differently preimpressed track, or similar detectable transitions. According to the invention, such a transition is detected and an offset value for the track error signal is generated from the comparison of the track error signal before and after the transition. Given an open track control loop, the values of the track error signal that are present before and after the change in property are to be compared in this case, for example by difference formation. Given a closed control loop, it suffices to use the peak value of the track error signal that occurs momentarily after the change in property, or a track error value that is present at a predetermined time interval after the change in property. In the simplest case, the offset value formed is fed additively to the track error signal of the track control loop.

The detection of the occurrence of fundamental changes in properties of the track is advantageously effected by detection of a header area. This exploits the fact that a fundamental change in property accompanies the arrangement of a header area, often also called prepit area, in many types of optical recording media. Such header areas are particularly simple to identify and a corresponding detection function is in many cases provided anyway in a corresponding apparatus, so that a corresponding separate detection unit can be dispensed with. The outlay for the apparatus is thus reduced.

The invention provides for the track error signal to be formed by means of one of the tracking methods push-pull method, three-beam method and differential push-pull method, even if a different method is used for the actual tracking in the track control loop. The track error signal of the aforementioned tracking methods is particularly well suited to determining the offset. The signal of the outer or one of the outer scanning beams is preferably used in the differential push-pull method.

As an alternative to this, according to the invention, a different signal impaired by the track offset of the scanner is utilized for forming the offset value. What is suitable for this, by way of example, is the high-frequency push-pull signal that is also influenced by the information markings of the track, that also experiences a detectable change when a fundamental change in property of the track occurs. Other suitable signals can also advantageously be used in this case. The use of a different signal instead of the track error signal for detecting the track error offset has the advantage that this signal is free of interference influences and thus enables further optimized formation of the offset value.

An apparatus according to the invention has a track control loop, a track property change detector and an offset value detector, which, in a manner dependent on a signal output by the track property change detector, generates an offset value from a track error signal of the track control loop and feeds said offset value to the track control loop.

The invention affords an optimized setting of the correct track error offset even in the event of an asymmetrical light distribution in the focal spot on the disk, the optical recording medium. Furthermore, all track error offsets, even those attributable to other electrical and optical causes, can be correctly compensated for.

Figure 2:
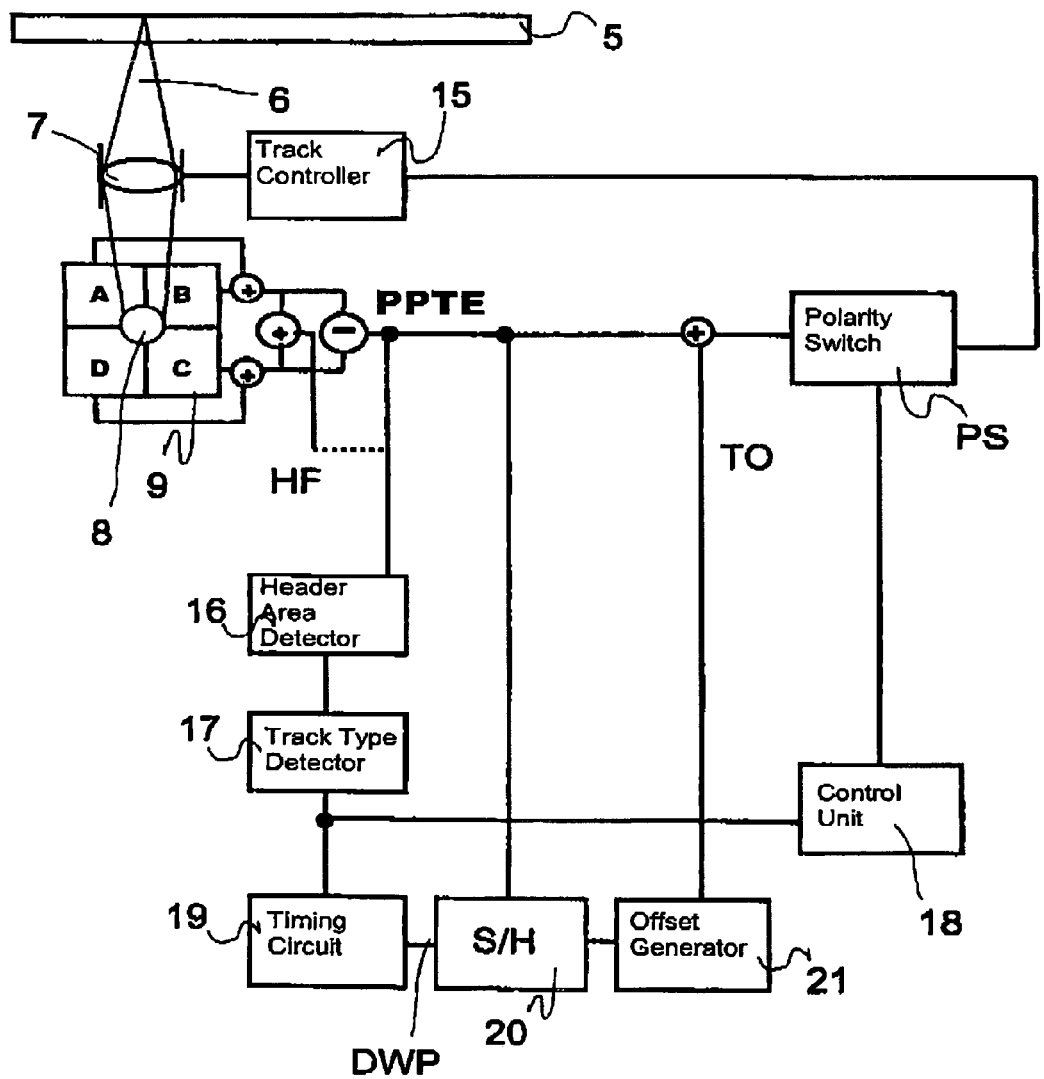

The invention is illustrated below on the basis of a preferred exemplary embodiment. In the figures:

FIG. 1 shows a groove/land transition in an optical recording medium and also associated signal diagrams, FIG. 2 shows a schematic illustration of an apparatus according to the invention.

FIG. 1 shows in the central area, by way of example, three adjacent tracks of an optical recording medium having different properties such as occur for example in the case of a DVD-RAM. In this case, the prepit or header areas that are present in a DVD-RAM are not illustrated here, for the sake of simplicity. A track 1G formed as a depression is illustrated in hatched fashion, while a track 1L formed as an elevation is illustrated without hatching. The track center 2, 2' brought about by offset, set by the track control and beset by offset is illustrated in the left-hand area; the tracks 1L, 1G are illustrated with exaggeratedly dense spacing in the right-hand area. An information marking 3 is illustrated by way of example; the illustration of further information markings has been dispensed with in order to simplify the figure. On the left and right of the central left-hand area of FIG. 1, the track error signal TE corresponding to the corresponding deviation from the track center 4 is depicted transversely with respect to the track. It can be seen that said track error signal has a profile that is symmetrical about a value 12 corresponding to the offset 2, while it is displaced with respect to a line 14 corresponding to the track center 4. The same applies correspondingly to the track error signal curve 10' illustrated in the central area, in the case of which curve the central value 12' is displaced in the other direction with respect to the line 14.

The illustration shows, in dashed fashion, the scanning beam crossing diagonally over the tracks 1L, 1G. The lower area of FIG. 1 specifies the corresponding track error signal TE of the open track control loop, as occurs without taking account of the change in polarity upon the transition from land track 1L to groove track 1G, and also the track error signal TE', which takes account of the corresponding polarity changeover. The latter is effected by inverting the signal TE after the transition from track 1G to track 1L, or vice versa. It can clearly be seen that the line 14 corresponding to the track center does not correspond to the arithmetic mean of the track error signal TE, TE'. The consequence of this is that if the arithmetic mean, corresponding to line 14, is used for setting the track error offset, the track center 4 is not followed, rather the line 2, 2' is followed in a manner offset with respect thereto. The upper area of FIG. 1 illustrates the track error signal TECL in the case of a closed track control loop. The track control loop has the property of bringing the track error signal TECL to the value 0. A jump in the signal TECL occurs only at the change from groove track 1G to land track 1L or from land track 1L to groove track 1G. This jump in the signal TECL is detected with the aid of a detection window pulse DWP and used for example by means of an integrator for correction of the track offset value. A corresponding track offset value TO is illustrated right at the top in FIG. 1. It starts at 0 on the left-hand side and is modified with each pulse in the signal DWP and the correspondingly associated jump in the signal TECL.

One of the specific properties of the DVD-RAM standard is the utilization both of groove track 1G and of land track 1L for data recording. In order not to have two independent data spirals, the optical recording medium, called disk hereafter, has, per revolution and track, a location at which a groove track 1G undergoes transition to a land track 1L, and vice versa. In the course of continually reading from or writing to the disk across such a transition, the polarity of the track control has to be changed over at said transition. If, for any arbitrary reason, the offset TO of the track error signal TE is not set such that the scanning light spot is kept symmetrical with respect to the track center, a changeover in the polarity at the transition has the consequence of pulling the light spot to the other side of the track center 4 by twice the magnitude of the track error TE. This is coupled with a significant excursion on the track error signal TECL. The occurrence of this excursion at the land-groove transition or at the groove-land transition is utilized as a criterion for setting the optimum track error signal offset TO. Since, in accordance with the DVD-RAM format, this transition can be detected using the header prepit (not illustrated here) and this is done for correct changeover of the track controller polarity anyway, it is possible for a digital DSP-based controller to compare the value of the track error signal that occurs shortly after the land-groove or at the groove-land transition with the value that occurs shortly before, and to utilize the disappearance of the difference as a criterion for optimum setting of the track error offset TO.

A crucial advantage of the invention resides in the universality of the criterion described. Irrespective of the cause of possible or necessary track error offsets TO, the criterion can be employed for setting the optimum value of the offset TO and thus for keeping the optical scanner on the track center 4. This is of importance primarily in connection with the push-pull method for generating the track error signal TE, since this method has an offset that depends to a very great extent on the adjustment of the optical system. Thus, even slight temperature-dictated displacement in the optical construction can have an extreme effect on the track error signal. The criterion described above can be employed irrespective of this.

One variation of the invention consists in utilizing different signals than the low-frequency push-pull signal for evaluating the criterion. What is advantageous here is the high-frequency push-pull signal that is present as read channel 2 in the system. The outer push-pull signal that is evaluated in the case of the differential push-pull method may also be utilized for the evaluation. Any signal that specifies the radial detector position can be evaluated correspondingly.

FIG. 2 shows a schematic illustration of an apparatus according to the invention. A optical recording medium 5 is scanned by means of a light beam 6 that is directed as light spot 8 onto a photodetector 9 by means of a focusing lens 7. The photodetector 9 has four quadrants A, B, C, D, the output signals of which are combined by means of adders and a subtractor to form a track error signal PPTE and a data signal HF, respectively. An offset TO is applied to the track error signal PPTE in a further adder and the result is fed to a polarity changeover switch PS. The output signal thereof is the input signal of a track controller 15 that acts on the objective lens 7 for track control in a known manner.

The apparatus furthermore has a track property change detector 16, 17. The latter comprises a header area detector 16, which detects the occurrence of header areas present in DVD-RAM disks and a track type detector 17, which detects the type of transition-land track 1L to groove track 1G or groove track 1G to land track 1L—and outputs a corresponding signal to a control unit 18. The latter initiates the changeover of the polarity changeover switch PS. Furthermore, the signal output by the track type detector 17 triggers a timing circuit 19, which outputs a pulse DWP to a sample-and-hold element 20 in a temporally offset manner according to predetermined criteria, which sample-and-hold element stores the present value of the track error signal PPTE corresponding to the peak in the signal TECL of FIG. 1. This value is fed to an offset generator stage 21, which is formed for example as an amplifier or as an integrator. It outputs the offset value TO.

As an alternative to the track error signal PPTE, the data signal HF may also be fed to the header area detector 16. Identification of the header area is expediently possible from this signal, too. This is indicated in dash-dotted fashion. It goes without saying that the exemplary embodiment described on the basis of a DVD-RAM represents only one of the possible advantageous specifications of the present invention.

The invention claimed is:

1. A method for optimized tracking of an optical scanner along a track of an optical recording medium, the track having information markings arranged in dense succession, and also having fundamental changes in properties in significantly lower density, the method comprising:
   generating a track error signal;
   detecting an occurrence of a fundamental change in a property of the track;
   generating an offset value from a comparison of a value of the track error signal that occurs before the detected fundamental change in property of the track to a value of the track error signal that occurs after the detected fundamental change in property of the track;
   generating the track error signal, taking account of the offset value; and
   repeating the aforementioned steps.

2. The method as claimed in claim 1, wherein the detection of the occurrence of the fundamental change in property of the track is effected by detection of a header area.

3. The method as claimed in claim 1, wherein the track error signal is generated by a tracking method comprising one of a push-pull method, a three-beam method and a differential push-pull method.

4. The method as claimed in claim 1, wherein a different signal that is impaired by a track offset of the optical scanner is generated instead of the track error signal.

5. An apparatus for reading from and/or writing to optical recording media including tracks having information markings arranged in dense succession, and fundamental changes in properties that occur in significantly lower density, the apparatus comprising:
   a track control loop for generating a track error signal;
   a track property change detector for detecting a track property change and generating a signal in response to the detection; and
   an offset value generator, which, in a manner dependent on the signal generated by the track property change detector, generates an offset value from a comparison of a value of the track error signal that occurs before the detection of the track property change to a value of the track error signal that occurs after the detection of the track property change and feeds said offset value to the track control loop.

* * * * *